Patented Nov. 12, 1946

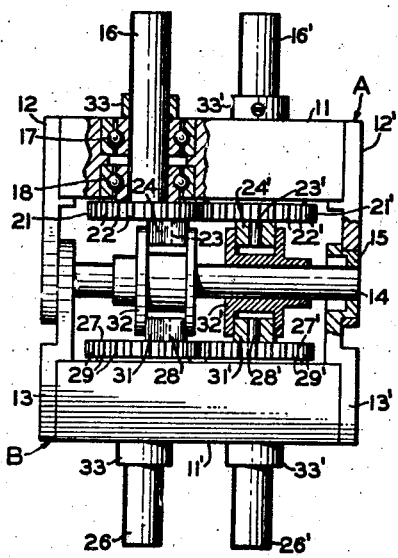

2,410,811

UNITED STATES PATENT OFFICE 2,410,811

ARTICULATED TRANSMISSION

Edward Dawson, New York, N. Y., assignor to Sperry Gyroscope Company, Inc., a corporation of New York Application June 24, 1944, Serial No. 541,887

18 Claims. (Cl. 74—69)

This invention relates to mechanical transmissions and is particularly concerned with a means for transmitting torque between shafts whose axes may move through a large angle relative to one another as the shafts revolve. It is particularly useful as an element in control systems of various types.

Prior art devices for the transmission of motion between shafts not in fixed angular relation to one another have often been characterized by a lack of independence between the rotation of the shafts and the angular displacement between the axes of the shafts. Under these circumstances a change in the angle between the axes of the shafts produces a corresponding change in the angular position of the input shaft relative to the position of the output shafts, a result which is undesirable in many applications. Other devices exist which do not have this disadvantage but they are not able to provide angular displacements as large as 180° between shaft axes without recourse to cumbersome arrangements having excessive size, weight, manufacturing cost, inaccuracy, wear and inefficiency of transmission.

The objects of the present invention may therefore be briefly stated as follows: the provision of a transmission wherein the motion of the driving members is at all times accurately transmitted to the driven members, even during angular movement between these members; the provision of an angular drive transmission having no dead center position; the provision of an angular drive transmission in which the wear of the moving parts is distributed as evenly as possible; the provision of an articulated transmission possessing structural simplicity in a marked degree with the inherent advantages of low first cost and reliability of operation; the provision of an angular drive coupling having a high degree of interchangeability among component parts, particularly as to driving and driven members.

Other objects and uses of the invention will become apparent from the following description and the accompanying drawing wherein for simplicity of explanation one form of structure in which the principles of the invention may be incorporated is illustrated.

In the drawing,

Fig. 1 is an elevational view with some parts in section, of one form of structure incorporating the invention wherein the apparatus is shown arranged with input and output shafts in alignment.

Fig. 2 is an elevational view similar to Fig. 1, but with the upper half of the mechanism turned back 90° relative to the lower half of the mechanism portions being broken away to permit showing the relative positions of adjacent crank arms.

Fig. 3 is an elevational view similar to Fig. 2, but with the lower half of the mechanism turned back 90° relative to the upper half of the mechanism.

Fig. 4 is an end view of Fig. 1, with broken lines showing the upper and lower shafts with an angular displacement between them.

Fig. 5 is a detail view of a crank pin slipper in engagement with a slider showing the use of anti-friction crank pin slippers rather than sliding blocks as illustrated in the prior figures.

Generally speaking, the invention comprehends converting the rotary motion of a driving member into a reciprocating motion of one or more sliding and turning members and simultaneously reconverting the reciprocation of the sliding members into rotary motion of one or more driven members, the motion being smoothly and accurately transmitted from the driving to the driven members in all orientations of the driving member with reference to the driven members. A displacement is established between the crank arms or other offset means of the various driving and driven members which effectively contributes to the smoothness and uniformity with which the motion is transferred from one member to another.

One embodiment of the invention comprises an articulated transmission or coupling such as a device having a pair of U-shaped supporting frames A, B, pivotally connected at their outer ends and having a cylindrical slide rail or spindle extending transversely from side to side of the U-shaped frames for supporting a pair of sliding members freely movable on the shaft. In each U-shaped supporting frame a pair of crankshafts having parallel axes of rotation but with a 90° angular displacement between them are mounted. Each of these crankshafts is rotatively connected, as by gears, to an adjacent crankshaft and includes a disc crank or crank terminal whose crank pin engages with an appropriately shaped slot or groove in the adjacent slider for transmitting the motion of the crankshafts to the sliding members and vice versa. One crankshaft mounted in each U-shaped supporting frame thus cooperates with a crankshaft 180° displaced from it in the other U-shaped supporting frame through the agency of one of the sliding members, to provide a series of interconnected parts for driving either crankshaft from the other. The complete mechanism, as illustrated, includes two such series of interconnected parts, each series being interrelated with the other by means of the rotative connections or gears between adjacent crankshafts. The pivotal connection of the U-shaped supporting frames permits the angle of alignment between the driving and driven crankshafts to be varied as desired within wide limits, a major purpose of the invention being to provide a means for transmitting motion between shafts whose alignment is continuously varying.

As shown in detail in Fig. 1, this form of structure may comprise a pair of frames or bearing members, 11, 11', each frame having a pair of supporting brackets such as end plates 12, 13, secured to it in any suitable manner. Dowelled into end plates 13, is a guide rail 14, spanning the space between these end plates. Cylindrical projecting lugs 15 integral with end plates 13, fit freely into corresponding cylindrical apertures in end plates 12, thus forming a hinged connection or joint between the driving half of the transmission and the driven half of the transmission, thereby permitting one half of the transmission to be swung through an angle of 180° or more relative to the other half. This relative angular motion of the two U-shaped supporting frames is clearly illustrated in Fig. 4.

In bearing member 11, a pair of crankshafts 16, 16' are mounted in suitable bearings, such as ball bearings 17 and 18, which permit these crankshafts to rotate freely in either direction of rotation. These crankshafts terminate in disc cranks 21, 21' which are provided with intermeshing peripherally disposed teeth 22, 22' so that the rotation of one crankshaft (for example, crankshaft 16) rotates the other crankshaft in the opposite direction. Projecting from disc cranks 21, 21' are crank pins 23, 23' respectively carrying suitably shaped sliding members such as slippers 24, 24' here shown for illustrative purposes as rectangularly shaped blocks.

In units of larger size it would obviously be advantageous to employ some form of anti-friction crank pin slipper rather than the simple sliding blocks illustrated in Fig. 1 through Fig. 4. In Fig. 5 an anti-friction or roller type crank pin slipper is shown by way of example.

In bearing member 11' a similar pair of crankshafts 26, 26' are rotatively mounted in ball bearings (not shown), each of these crankshafts having attached to it or integral with it a disc crank 27, 27' from which project crank pins 28, 28' carrying rectangularly shaped slipper blocks 31, 31'. Disc cranks 27, 27' on crankshafts 26, 26' likewise carry peripheral gear teeth 29, 29' whereby the rotation of either of these two crankshafts produces an opposite rotation of the other. Mounted on slide rail 14 are a pair of sliders, collars or shuttles 32, 32' here shown as radially flanged or annularly grooved hollow cylindrical members. These sliders or annularly depressed sleeves are free to reciprocate upon as well to rotate about slide rail 14. Each of these sliders freely engages both a crank pin slipper block attached to a disc crank of one driving element and a crank pin slipper block attached to a correspondingly located disc crank of one of the driven elements. For example, slider 32 engages both slipper block 31 which is attached to crank pin 28 and disc crank 27 and slipper block 24 which is attached to crank pin 23 and disc crank 21. Thus sliders 32, 32' serve to mechanically interconnect the correspondingly located upper and lower crankshafts for the transmission of motion between these crankshafts in either direction.

The various cranks and crankshafts are held in properly aligned operating positions by retaining collars 33 secured to the crankshafts by suitable set screws as illustrated in the drawing.

It should be observed that in assembling the mechanism of the invention, the teeth of disc crank 21, for example, are so meshed with those of disc crank 21' that the respective crank arms are displaced by a quarter revolution relative to each other. This relationship of the crank arms may best be observed in Figs. 2 and 3. Similarly when disc crank 27 is placed in mesh with disc crank 27', a quarter revolution displacement is created between these crank arms also. When thus assembled the relationship of the adjacent crankshafts is such that a translational component of force effective to move the sliders back and forth on guide rail 14 is always available whenever any of the crankshafts is rotated. This feature of the invention insures a mechanism in which no dead center position occurs anywhere in the operating cycle.

It may likewise be observed that in assembling the mechanism the parts may advantageously be arranged so that the crank arms of any two oppositely facing crank discs are displaced by a half revolution relative to one another when viewed from corresponding ends, with the result that when either slipper block engaged with a given slider is moving forward relative to the observer the other slipper block engaged with the same slider is moving backward. For example, with shaft 16' and 26' in alignment as in Fig. 1, slipper block 24' is arranged to move backward within the flanges of slider 32' while slipper block 31' is moving forward within the flanges of slider 32', and similarly for the other set of driving and driven elements of the transmission.

This disposition of the crank arms may be noted in Fig. 1. It will be observed that when viewed from above along shaft 16 crank pin 23 is directly to the left of its center of rotation, while crank pin 28 when viewed from below along shaft 26 is directly to the right of its center of revolution; hence, crank pin 23 is displaced by a half revolution from crank pin 28.

This feature of the invention insures that the relative motion between the slipper blocks and the sliders will be held to a minimum and that the sliders will be caused both to slide and to rotate on slide rail 14, thus reducing the wear between these parts to a minimum and distributing it over the entire inside area of the slider flanges. While this is a preferred arrangement of the parts of the device, it should be noted that the device will operate satisfactorily except for a greater friction loss if the oppositely facing crank pin discs are assembled with no angular displacement between them.

In operation, the rotation of one crankshaft, 26 for example, produces a similar rotation of crank pin 28 whose slipper block 31 engages freely with the flanges of slider 32. The rotational motion of crank pin 28 thus effects a simple harmonic reciprocation of slider 32 on guide rail 14, the path of travel of slider 32 being equal to twice the throw of crank pin 28. Slider 32 being also in engagement with crank pin 23 of crankshaft 16 carries crank pin 23 with it as it reciprocates on guide rail 14 thus, in an exactly converse manner, the simple harmonic reciprocation of slider 32 is reconverted into a rotary motion of crankshaft 16, the rotation of crankshaft 16 being opposite in direction to the rotation of crankshaft 26, since disc cranks 21 and 27 are displaced by a half revolution relative to one another. In an exactly similar manner, the rotation of crankshaft 26' produces a rotation of crankshaft 16' at the same rate but opposite in direction to the rotation of crankshaft 26'.

Furthermore, since disc cranks 27 and 27' are geared together and disc cranks 21 and 21' also are geared together in a similar manner, the motion of crankshaft 26 will produce simultaneous rotation of crankshafts 16' and 26', with crankshaft 16' rotating in the same direction as crankshaft 26, but with crankshaft 26' rotating in the opposite direction. It is apparent, therefore, that the invention provides a coupling device or a transmission in which any one of the crankshafts may be employed as the driving member with any of the remaining crankshafts then serving as driven members, one of the driven members rotating in the same direction and the other driven members rotating in the direction opposite to the rotation of the driving member.

Provision of the hinged connection between the two supporting brackets or frames together with complete symmetry and proper intermeshing of all parts permits one pair of crankshafts to be shifted through a wide angle of displacement relative to the other pair of crankshafts without interfering with the transmission of motion from one crankshaft to another. The invention, therefore, makes possible the driving of one shaft at a uniform rate of rotation from a second shaft which is not aligned with the first shaft, the directions of rotation of the two shafts selected being the same or opposite as desired.

The gears 21, 21' and 27, 27', in the embodiment herewith disclosed have unity ratios.

As many changes could be made in the above described construction and many different embodiments of this invention could be made without departing from the scope thereof it is intended that all matter contained in the specification or shown in the drawing, be interpreted in an illustrative and not in a limiting sense.

What is claimed is:

1. An articulated mechanical transmission comprising a first frame member having spaced end plates, a slide rail spanning the space between said end plates, a second frame member swivel joined to said first frame member, a collar encircling but free to reciprocate upon said slide rail, a drive shaft rotatably mounted in said first frame member and having a crank pin meshing with said collar, and a driven shaft rotatably mounted in said second frame member and likewise having a crank pin meshing with said collar, the crank pin of said drive shaft being displaced a half revolution relative to the crank pin of said driven shaft whereby minimum wear and uniform distribution of friction between said crank pins and said collar is obtained.

2. A mechanical transmission comprising a pair of swivel joined frame members having spaced end plates, a slide rail spanning the space between said end plates, a slider free to oscillate on said slide rail, a pair of crankshafts rotatively mounted in said frame members and engaging said oscillatable slider, the cranks of said crankshafts being arranged with diametrically opposite throws as viewed from corresponding ends whereby rotation of said cranks not only reciprocates but also revolves said slider thus distributing the friction and wear on said slider.

3. An articulated mechanical transmission comprising a first frame member having a slide rail spanning the space between the end plates thereof, a second frame member freely suspended from said first frame member, a pair of engageable sliders mounted for reciprocation on said slide rail, a first pair of rotatively interconnected shafts journalled in said first frame member and having cranks meshing with said sliders but displaced a quarter of a revolution relative to one another, and a second pair of rotatively interconnected shafts journalled in said second frame member and meshing with said sliders, the cranks of said second pair of shafts being displaced a half revolution relative to the cranks of the first pair of shafts whereby the application of rotational torque to any of said shafts produces a translatory force acting on said sliders in all positions of these members thus providing a mechanism which has no dead center.

4. An articulated transmission as claimed in claim 3 wherein one of said first pair of shafts acts as an input shaft and both of said second pair of shafts act as output shafts, one of said output shafts rotating in the same direction as the input shaft and the other rotating in a direction opposite to the direction of rotation of said input shaft.

5. An articulated transmission as claimed in claim 3 wherein either shaft of either pair of shafts acts as the input shaft and either shaft of the other pair of shafts acts as the output shaft.

6. An articulated transmission comprising a pair of frame members having slide rail means mounted therein, said frame members being pivotally connected to turn through the major arc of a circle relative to one another, torque transmitting means journalled in each of said frame members, reciprocating slider means movable on said slide rail means, interconnecting crank pin means between said torque transmitting means journalled in one of said frame members and said slider means for converting the rotational motion of said torque transmitting means into a translatory motion of said slider means, and interlinking crank pin means between said slider means and said torque transmitting means journalled in the other of said frame members for reconverting the translatory motion of said slider means into rotational motion of the torque transmitting means journalled in the other of said frame members.

7. In combination, a first frame, a guide shaft secured in said first frame, a second frame swingably suspended from said first frame, an engageable sleeve supported by and freely slidable along said guide shaft adjacent to said frames, a drive shaft rotatable in said first frame, and a driven shaft journalled in and swingable with said second frame, said drive shaft and said driven shaft having axes perpendicular to the axis of said guide shaft, and said engageable sleeve coacting both with said drive shaft and said driven shaft so as to produce rotation of said driven shaft exactly corresponding in rate but opposite in direction to the rotation of said drive shaft.

8. In a transmission having a pair of frame members, a pair of crankshafts rotatably mounted in said frame members, a sleeve freely movable on a slide bar pivoted within said frame members and slidably engaging the crank pins projecting from said crankshafts, in combination, a hinge interlinking said frame members so as to permit adjustment of the angle of drive between said crankshafts within limits defining the major arc of a circle.

9. An articulated transmission mechanism comprising a pair of frame members, a slide rail supported by one of said frame members, a hinged connection between said frame members free to open through the major arc of a circle, a pair of bearings located in said frame members, an input crank shaft and an output crank shaft mounted for rotation in said bearings, and a sleeve slidably mounted on said slide rail and engaging the crank pins of said input and output crankshafts, said hinged connection permitting the alignment of said crankshafts to be changed as desired within widely spaced limits.

10. An angular drive mechanism comprising a pair of frame members having a slide rail set into the end plates of one of said frame members, means for pivotally connecting said frame members for relative angular movement thereof through at least a semi-circular arc of displacement, a pair of crankshafts having interlocking disk cranks rotatively mounted in each of said frame members, and sliders mounted for reciprocation on said slide rail, each slider freely engaging crank pins projecting from crankshafts oppositely mounted in said frame members whereby torque is continuously and unvaryingly transmitted from an input crankshaft mounted in one of said frame members to a pair of output crankshafts mounted in the other of said frame members.

11. A coupling device for connecting a driving shaft to a driven shaft, comprising a pair of shaft terminals, articulated bearing members journalling said terminals for angular adjustment about a pivot axis transverse of said terminals, a crank on each of said terminals, and a shuttle having annular crank-engaging means, and slidable along said transverse axis for transmitting the motion of the driving crank to the driven crank.

12. A coupling device for rotatable shafts, comprising a pair of interconnected driving shafts, a pair of interconnected driven shafts, a crank on each of said shafts, and a pair of reciprocating sliders each transmitting simple harmonic motion from one of said driving cranks to one of said driven cranks as said driving shafts rotate uniformly, the cranks of one of said interconnected pairs of shafts being phase displaced from the cranks of the other pair of shafts.

13. A coupling device for rotatable shafts, comprising a pair of interconnected driving shafts, a pair of interconnected driven shafts, a crank on the end of each of said shafts, and a pair of reciprocating shuttles both slidable along an axis perpendicular to said shafts, each of said shuttles engaging a pair of cranks for transmitting substantially simple harmonic motion from one of said driving cranks to one of said driven cranks as said driving shafts rotate uniformly, one of said shuttles being phase displaced from the other shuttles by an amount corresponding to substantially a quarter revolution.

14. A coupling device for rotatable shafts, comprising a pair of parallel gear connected driving shafts, a pair of parallel gear connected driven shafts, a crank on the end of each of said shafts, and a pair of reciprocating shuttles both slidable along an axis perpendicular to said shafts, each of said shuttles engaging a pair of cranks for transmitting substantially simple harmonic motion from one of said driving cranks to one of said driven cranks as said driving shafts rotate uniformly, one of said shuttles being phase displaced from the other shuttle by an amount corresponding to substantially a quarter revolution.

15. A coupling device for rotatable shafts, comprising a pair of parallel gear connected driving shafts, a pair of parallel gear connected driven shafts, supports for journalling each of said pairs of shafts, an articulated joint for adjustably positioning said supports about an axis perpendicular to all of said shafts, a crank on the end of each of said shafts, and a pair of reciprocating shuttles, each being slidable along said axis and having means engaging one of said driving cranks and one of said driven cranks for all positions of said supports, said shuttles thereby transferring reciprocating motion from said driving cranks to said driven cranks, said shuttles being arranged so that when one of said shuttles occupies a position at one extremity of its stroke, the other shuttle occupies a position intermediate the extremities of its stroke.

16. A coupling device as claimed in claim 15 wherein said shuttles comprise annular flanged members freely movable on said perpendicular axis, and wherein the respective cranks engaging each shuttle are displaced from one another by half a revolution.

17. A transmission for transmitting torque between rotating shafts which are independently variable through an angle of 180° relative to one another as the shafts revolve, comprising a rotatable driving shaft and a rotatable driven shaft, an articulated coupling for the shafts including a pair of bearing frames, a rotatable support in each frame for one of said shafts, means for pivoting said frames for mutual free angular movement about an axis perpendicular to both of said shafts, a spindle extending along said axis, crank means on each of said shafts, and a slider engaging both of said cranks and reciprocable on said spindle for transmitting motion from one crank to the other simultaneously with mutual angular variation of the axes of said shafts.

18. Transmission according to claim 17, wherein the said cranks are displaced from one another by 180°.

EDWARD DAWSON.